United States Patent [19]

Honma et al.

[11] Patent Number: 4,815,808
[45] Date of Patent: Mar. 28, 1989

[54] OPTICAL FIBER CABLE FIXING MECHANISM IN PLUG

[75] Inventors: Kiyoaki Honma, Yokohama; Sueji Shibata, Tokyo, both of Japan

[73] Assignee: Yamaichi Electric Mfg. Co., Ltd., Tokyo, Japan

[21] Appl. No.: 11,212

[22] Filed: Feb. 3, 1987

[30] Foreign Application Priority Data

Feb. 3, 1986 [JP] Japan .............................. 61-14188[U]

[51] Int. Cl.[4] .................................................. G02B 6/36
[52] U.S. Cl. ................................ 350/96.20; 350/96.21
[58] Field of Search ........................... 350/96.20, 96.21

[56] References Cited

U.S. PATENT DOCUMENTS

| | | | |
|---|---|---|---|
| 4,362,356 | 12/1982 | Williams et al. | 350/96.21 X |
| 4,441,786 | 4/1984 | Hulin et al. | 350/96.21 |
| 4,576,437 | 3/1986 | Ohta et al. | 350/96.20 |
| 4,589,727 | 5/1986 | Williams | 350/96.20 |
| 4,645,296 | 2/1987 | Cattin et al. | 350/96.20 |

FOREIGN PATENT DOCUMENTS 58-126413 8/1983 Japan .

Primary Examiner—William L. Sikes
Assistant Examiner—Akm E. Ullah
Attorney, Agent, or Firm—Wenderoth, Lind & Ponack

[57] ABSTRACT

An optical fiber cable comprising an optical fiber, an inner insulator, tension resistant fibers and an outer insulator is fixed to a plug comprising a male plug member and a female plug member which are helically meshed with each other by driving the male plug member into the female plug member and provided with respectively abutting surfaces. The tension resistant fibers are divided into a plurality of bundles, which are extended outwardly from between the inner and outer insulators. In this state, the male plug member is screwed into the female plug member, thereby firmly clamping the outwardly extended bundles of tension resistant fibers between the abutting surfaces of the male and female plug members.

4 Claims, 3 Drawing Sheets (A)
Prior Art (B)
Prior Art

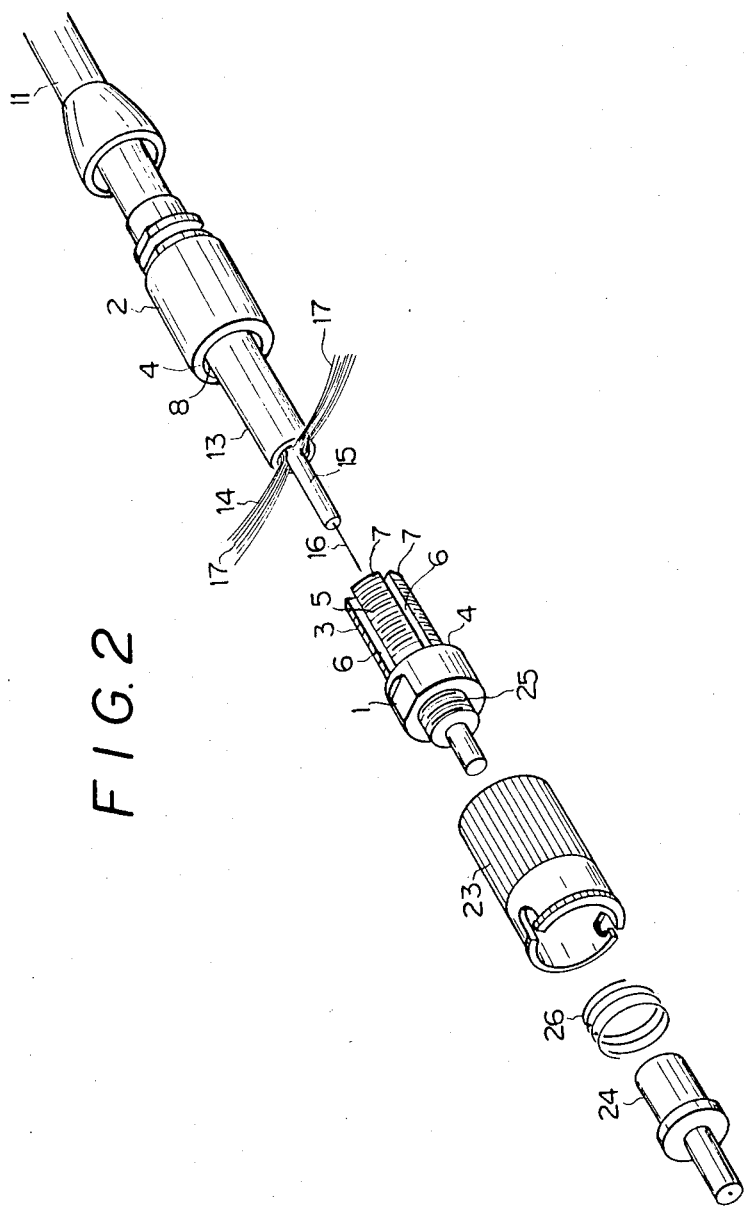

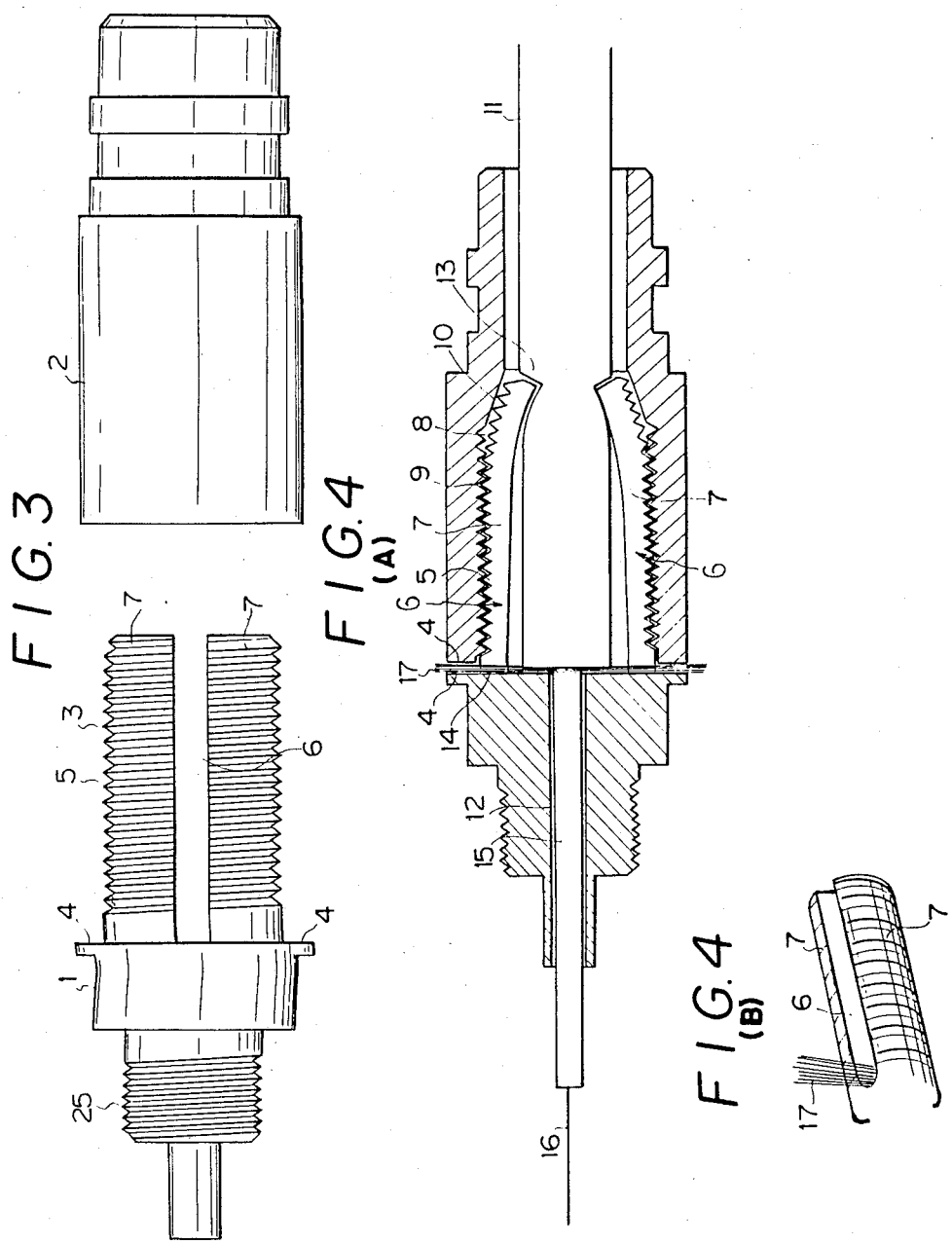

OPTICAL FIBER CABLE FIXING MECHANISM IN PLUG

BACKGROUND OF THE INVENTION

1. Field of the Invention

The present invention relates to an optical fiber cable fixing mechanism in a plug, utilizing tension resistant fibers in an optical fiber cable being inserted through and retained by the plug as means for fixing the optical fiber cable to the plug against the tension exerted onto the optical fiber cable.

2. Description of the Prior Art

Generally, as shown in FIG. 1(A), an optical fiber cable 1 comprises an inner insulator 7 surrounding an optical fiber, an outer insulator 4, and tension resistant fibers 3 inserted into the outer insulator 4 so as to surround the inner insulator 7. The tension resistant fibers 3 lacking in expansion and contraction are in advance exposed to the outside from the terminal end of the outer insulator 4 and arrayed in the shape of an open umbrella. The optical fiber cable 1 is inserted through and retained in a plug 2 by screwing a male plug member 5 into a female plug member 6 to urge the umbrella-shaped fibers 3 to the bottom of a screw hole in the female plug member 6 with the leading end of the male plug member 5, thereby fastening and fixing the optical fiber cable 1 within the plug 2. At this time, the inner insulator 7 surrounding the optical fiber and projecting from the umbrella-shaped fibers 3 is passed through an aperture formed in the central bottom of the screw hole of the female plug member 6 to extend out of the female plug member 6. Thus, the optical fiber cable is fixed against the tension exerted thereonto and the inner insulator 7 is prevented from being shifted (such as disclosed in Japanese Utility Model Public Disclosure No. 58-126413).

Use of the fibers 3 lacking in expansion and contraction as means for fixing the optical fiber cable 1 against the tension exerted thereonto is very advantageous because large resistance force against the tension can be obtained. With the prior art optical fiber cable fixing mechanism, however, the fibers 3 must be cut so as to be arrayed in the shape of an open umbrella. This operation is very cumbersome and time-consuming. Further, in the prior art, the optical fiber cable is fixed by producing tension in a direction reverse to the male plug portion driving direction on the basis of the friction produced between the folded-back portions of the umbrella-shaped fibers 3 and the inner wall of the female plug member 6 by the driving force of the male plug member 5 into the female plug member 6. The friction produced by the driving of the male plug member 5 into the female plug member 6 is not always constant and, therefore, sufficient tension of the terminal ends of the fibers 3 in the aforesaid reverse direction is not always constant, either. For this reason, there is a possibility of the folded-back portions of the fibers 3 being slackened, thereby failing to obtain satisfactory fixing of the optical fiber cable 1 against the tension.

OBJECT AND SUMMARY OF THE INVENTION

The main object of the present invention is to provide a mechanism for readily fastening and clamping tension resistant fibers of an optical fiber cable without arraying the fibers in the shape of an open umbrella and easily fixing the cable reliably without slackening or deflecting the fibers within a plug.

To attain the object described above, according to the present invention, there is provided an optical fiber cable fixing mechanism in a plug composed of male and female plug members which are provided with respectively abutting surfaces and helically meshed with each other to fasten tight an optical fiber cable having tension resistant fibers, comprising dividing the tension resistant fibers into a plurality of bundles, taking out the plurality of bundles from between the abutting surfaces of the male and female plug members, and clamping the plurality of bundles between the abutting surfaces by driving the male plug member into the female plug member.

The above and other objects, characteristic features and advantages will become apparent to those skilled in the art as the disclosure is made in the following description of preferred embodiments of the invention, as illustrated in the accompanying drawings.

BRIEF DESCRIPTION OF THE DRRAWINGS

FIG. 2 is an exploded perspective view illustrating one embodiment of the optical fiber cable fixing mechanism in a plug according to the present invention.

FIG. 3 is a side view illustrating male and female plug members of the plug in FIG. 2.

FIG. 4(A) is a cross-sectional view illustrating the optical fiber cable fixing mechanism in FIG. 2.

FIG. 4(B) is a perspective view illustrating part of a cable chuck cylinder of the plug in FIG. 2 having a bundle of tension resistant fibers passed therethrough.

DETAILED DESCRIPTION OF THE PREFERRED EMBODIMENTS

Figure 1:
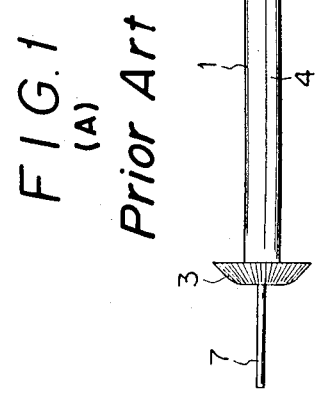
FIG. 1(A) is a side view illustrating a prior art optical fiber cable.
FIG. 1(B) is a cross-sectional view illustrating a prior art mechanism for fixing the optical fiber cable of FIG. 1(A) in a plug.
Figure 1:
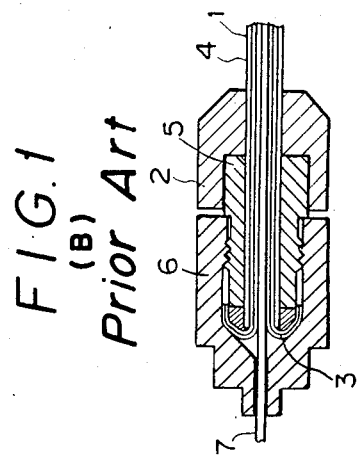

The present invention will now be described with reference to the illustrated embodiments.

FIGS. 2 to 4 illustrate one embodiment of an optical fiber cable fixing mechanism in a plug according to the present invention. The plug comprises a male plug member 1 and a female plug member 2 which are helically meshed with each other. The male plug member 1 has an abutting surface 4 from which a cable chuck cylinder 3 integrally projects. The cable chuck cylinder 3 has a plurality of axial slits 6 circumferentially equidistantly formed therein to form a plurality of cable chuck members 7. Each of the axial slits 6 opens at the free end of the cable chuck cylinder 3 and reaches the abutting surface 4 of the male plug member 1. Each of the cable chuck members 7 has an external thread 5 formed on the outer periphery thereof. In this embodiment, the number of the axial slits 6 formed is four and therefore the number of the cable chuck members 7 is also four. Due to the presence of the axial slits 6 the free end of the cable chuck cylinder 3 composed of the cable chuck members 7 can be elastically contracted.

The female plug member 2 has an abutting surface 4, a screw hole 8 and a tapered hole 10 adjacent to the screw hole 8. The inner wall of the female plug member 2 defining the screw hole 8 has formed therein an internal thread 9 which is helically meshed with the external thread 5 of the cable chuck cylinder 3 when the male plug member 1 is screwed into the female plug member 2. The tapered hole 10 reduces its diameter gradually in a direction in which the male plug member 1 is screwed into the female plug member 2 and, when the male plug member 1 is completely driven into the female plug member 2, the inner wall of the female plug member 2 defining the tapered hole 10 is adapted to press the free end of the cable chuck cylinder 3 inwardly. At this time, therefore, the free end of the cable chuck cylinder 3 is contracted.

An optical fiber cable 11 comprises an optical fiber 16, an inner insulator 15 surrouding the optical fiber 16, tension resistant fibers 14 surrounding the inner insulator 15 and an outer insulator 13 surrounding the tension resistant fibers 14. The outer insulator 13 of the optical fiber cable 11 is inserted into the female plug member 2 from one end thereof to project from the screw hole 8 and is inserted into the male plug member 1 from the free end of the cable chuck cylinder 3 while the tension resistant fibers 14 of the optical fiber wire 11 are exposed to the outside from between the inner and outer insulators 15 and 13, and the inner insulator 15 having the optical fiber 16 projecting therefrom is inserted through an insertion hole 12 having a diameter smaller than that of the cable chuck cylinder 3 and coaxially communicating with the cable chuck cylinder 3. The exposed tension resistant fibers 14 are divided into a plurality of bundles 17 circumferentially equidistantly extending radially outwardly from between the inner and outer insulators 15 and 13. These bundles 17 are passed through the slits 6 of the cable chuck cylinder 3 and taken out from between the abutting surfaces 4 of the male and female plug members 1 and 2. In this state, the male plug member 1 is driven into the female plug member 2 to firmly clamp the bundles 17 of tension resistant fibers 14 between the abutting surfaces 4 of the two plug members 1 and 2. In this embodiment, the number of the bundles 17 into which the tension resistant fibers 14 have been divided is two. The two bundles 17 are passed through two of the four slits 6 of the cable chuck cylinder 3. The tension resistant fibers 14 may be divided into four bundles 17 so that the four bundles are passed one each through the four slits 6 of the cable chuck cylinder 3.

The cable chuck cylinder 3 is adapted to receive and catch hold of the outer insulator 13 of the optical fiber cable 11 when the bundles 17 are clamped between the abutting surfaces 4 of the male and female plug members 1 and 2. In proportion as the cable chuck cylinder 3 of the male plug member 1 advances into the female plug member 2 with their external and internal threads 5 and 9 helically meshed with each other, it is gradually pressed inwardly by the inner wall of the female plug member 2 defining the tapered hole 10, with the result that the cable chuck members 7 bite the outer insulator 13 at their leading edges as is best shown in FIG. 4(A), thus catching hold of the outer insulator 13. At this time, the bundles 17 of tension resistant fibers 14 are firmly clamped between the abutting surfaces 4 of the male and female plug members 1 and 2. The bundles 17 projecting from the outer periphery of the plug are cut off, if necessary.

Returning to FIG. 2, reference numeral 23 designates a coupler for coupling the illustrated plug and a mating plug (not shown) together, numeral 24 a ferrule helically meshed with an external thread portion 25 formed at the other end of the male plug member 1 for centrally retaining the optical fiber 16, and numeral 26 a coil spring for elastically retaining the ferrule 24.

Figure 6:
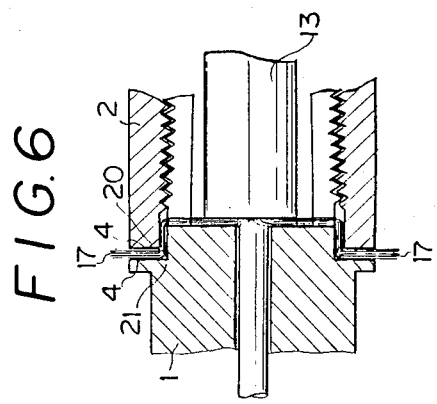
FIG. 6 is a partially cutaway cross section illustrating still another embodiment of the optical fiber cable fixing mechanism in a plug according to the present invention.
Figure 5:
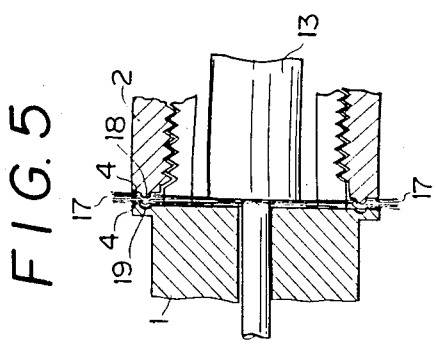
FIG. 5 is a partially cutaway cross section illustrating another embodiment of the optical fiber cable fixing mechanism in a plug according to the present invention.

FIGS. 5 and 6 illustrate second and third embodiments of the optical fiber cable fixing mechanism according to the present invention, which aim at reliably increasing the force for clamping the bundles 17 of tension resistant fibers 14 in comparison with the first embodiment of FIGS. 2 to 4 wherein the abutting surfaces 4 of the male and female plug members 1 and 2 are flat. To be specific, in the second embodiment of FIG. 5, the abutting surfaces 4 of the male and female plug members 1 and 2 are provided with concave and convex portions 19 and 18 which are snugly fitted with each other, whereby the bundles 17 are urged into the concave portions 19 by the convex portions 18 with the driving of the male plug member 1 into the female plug member 2. In the third embodiment of FIG. 6, the abutting surfaces 4 are provided with stepped portions 21 and 20 which are snugly fitted with each other, whereby the bundles 17 are clamped in a bent fashion between the stepped portions 20 and 21.

Figure 7:
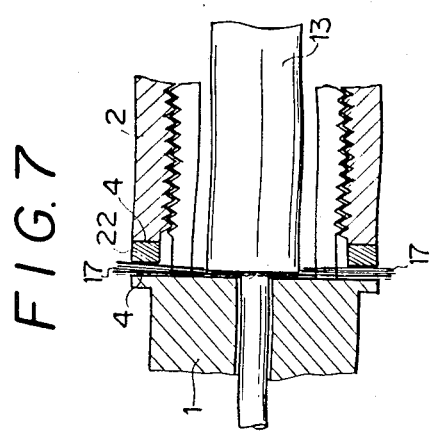
FIG. 7 is a partially cutaway cross section illustrating yet another embodiment of the optical fiber cable fixing mechanism in a plug according to the present invention.

FIG. 7 illustrates a further embodiment of the optical fiber cable fixing mechanism according to the present invention, in which an elastic ring 22 is interposed between the abutting surfaces 4 of the male and female plug members 1 and 2 whereby the bundles 17 are clamped between the abutting surfaces 4 while compressing the elastic ring 22.

According to the present invention, as described above, an optical fiber can easily be fixed by dividing tension resistant fibers into a plurality of bundles, pulling the bundles out of a plug, clamping the bundles between the abutting surfaces of male and female plug members of the plug and, if necessary, cutting off the portions of the bundles projecting outwardly of the plug unlike the prior art requiring the tension resistant fibers to be arrayed in the shape of an open umbrella and extended along the inner wall of the female plug member defining the insertion hole for the male plug member. Therefore, the cable fixing operation can advantageously be carried out from the standpoints of labor and time consumption. In other words, assemblage of the cable into the plug can be effected at a very high speed. Further, according to the present invention, since the tension resistant fibers can be clamped in a bundled state between the male and female plug members after they are pulled outwardly of the two plug members, they can reliably be clamped between the abutting surfaces of the two plug members without causing them to be slackened. Thus, the cable can advantageously fixed to the plug with high efficiency.

What is claimed is:

1. An optical fiber connector comprising:
   a male plug member, said male plug member including an insertion hole for receiving an optical fiber cable therethrough, a first abutting surface, at least two cable chuck members extending outwardly from said first abutting surface, said at least two cable chuck members defining at least two slits therebetween for receiving respective bundles of tension resistant fibers of an optical fiber cable therethrough and adjacent said first abutting surface, and said at least two cable chuck members having external threads; and a female plug member, said female plug member including a screw hole for receiving an optical fiber cable therethrough, said screw hole having internal threads for threadedly receiving said external threads of said at least two cable chuck members of said male plug member when said male and female plug members are threadedly connected, said female plug member including a second abutting surface for abutting and mating with said first abutting surface of said male plug member and for clamping bundles of tension resistant fibers passed through said at least two slits and adjacent said first and second abutting surface when said male and female plug members are threadedly connected.

2. An optical fiber connector as in claim 5, wherein said first and second abutting surfaces have mating convex and concave portions.

3. An optical fiber connector as in claim 5, wherein said first and second abutting surfaces have mating stepped portions.

4. An optical fiber connector as in claim 5, wherein said first and second abutting surfaces have means for receiving an elastic ring therebetween for retaining the elastic ring when said male and female plug members are threadedly connected.

* * * * *